Dec. 10, 1963     F. A. RITTER     3,113,804
SLIDING SWIVEL SEAT FOR BOATS
Filed April 23, 1963     3 Sheets-Sheet 1

INVENTOR
FRED A. RITTER
BY Kingsland, Rogers,
Ezell & Robbins
ATTORNEYS

Dec. 10, 1963   F. A. RITTER   3,113,804
SLIDING SWIVEL SEAT FOR BOATS
Filed April 23, 1963   3 Sheets-Sheet 2

INVENTOR
FRED A. RITTER
BY Kingsland, Rogers,
Ezell & Robbins
ATTORNEYS

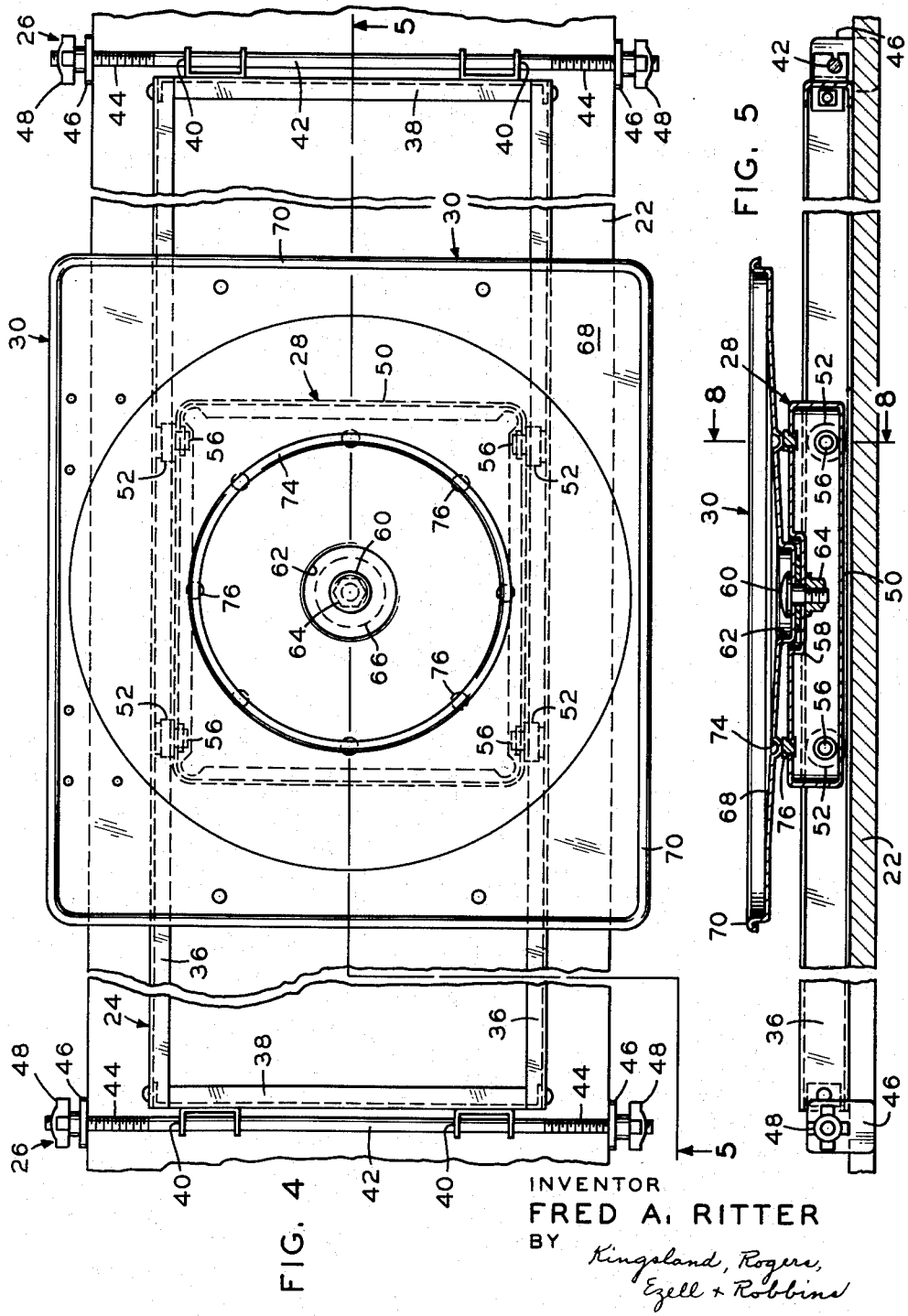

United States Patent Office 3,113,804
Patented Dec. 10, 1963

3,113,804
SLIDING SWIVEL SEAT FOR BOATS
Fred A. Ritter, 9117 Meadowbrook, Overland 14, Mo.
Filed Apr. 23, 1963, Ser. No. 274,965
7 Claims. (Cl. 297—252)

This invention relates to improvements in boat seats and in particular is concerned with improvements in a boat seat adapted to be scured to the thwart of a boat in which the seat of this invention provides for sliding along the thwart and swivelling.

By means of this invention there has been provided a portable boat seating device which can be very simply attached to the thwart of a boat. The portable boat seating device is light in weight and, through the provision of adjustable clamps, can be secured to thwarts of varying sizes on fishing boats, pleasure boats, and the like, and it will be understood that it may be attached to any plank whether it be in a boat or elsewhere. The portable seat is provided with a frame and clamps which adapt it to being secured to the thwart, and the frame is further provided with tracks which receive a wheeled carriage supporting the seat. Through this structure the seat can slide along the tracks and, through a pivotable connection between the seat and the carriage, swivelling of the seat is provided.

For comfort of the user, the boat seat may be further provided with a pair of arm rests and a hingeable back rest, such that the back rest may be folded flat over the seat when not in use, or swung to an operative back supporting position where it remains firmly secured by a hinge stop.

The seat of this invention is rugged in construction and can be very simply employed by those who use it without any special tools or training of any type. By means of this portable seat of this invention, the seat can be moved and pivoted from one end of a boat thwart to another depending upon the desire of the user and the necessity of movement of the seat. Further, pivoting in a full 360° direction is provided so that full adaptability of the seat is made possible so that the user can face in any desired direction.

Further, the basic seat of this invention may be employed without the arm rest and back rests where this is desired, as the structure is simple and the seat may use only a cushion without any of the other rests described.

The carriage that supports the seat permits back and forth positioning of the seat; yet this carriage is inexpensively made and easily installed on any boat.

The above features are objects of this invention and further objects will appear in the detailed description which follows and will be otherwise apparent to those skilled in the art.

For the purpose of illustration, there is shown in the accompanying drawings a preferred embodiment of this invention. It is to be understood that these drawings are for the purpose of example only and that the invention is not limited thereto.

In the drawings:

FIGURE 4 is an enlarged top plan view with the cushion, arm rests and back rest removed;

FIGURE 5 is a view in section taken on line 5—5 of FIGURE 4;

Figure 1:
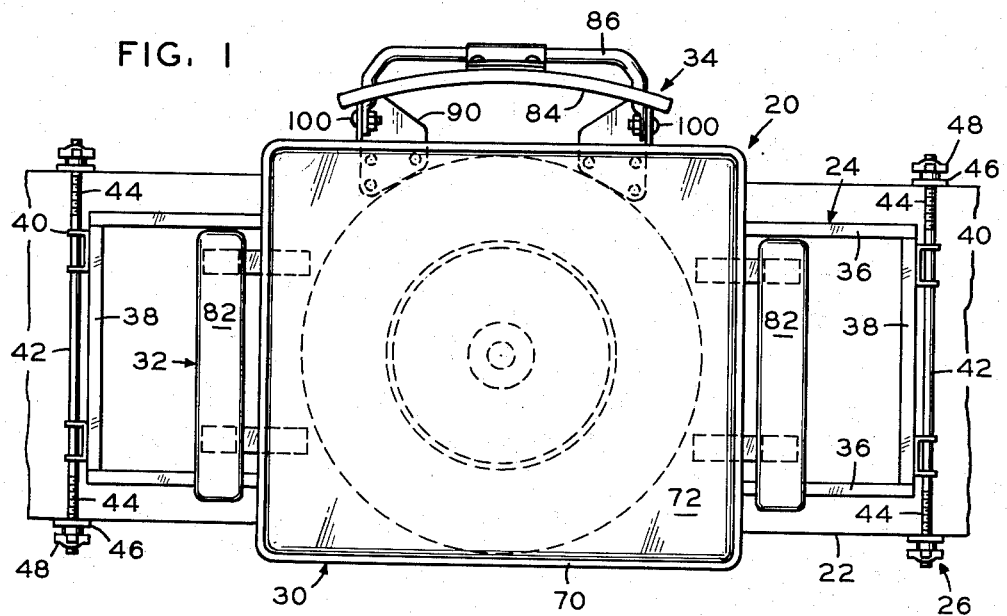
FIGURE 1 is a top plan view of the seat.

Referring now to the drawings, the portable seat of this invention is shown generally indicated by the reference numeral 20 in FIGURE 1 attached to a thwart 22 of a boat. The portable seat 20 is comprised of major elements constituting a frame 24, adjustable thwart clamps 26, a wheeled carriage 28, a pivotable seat or what may be termed a seat panel 20 mounted upon the carriage, arm rests 32, and a back rest 34.

Figure 3:
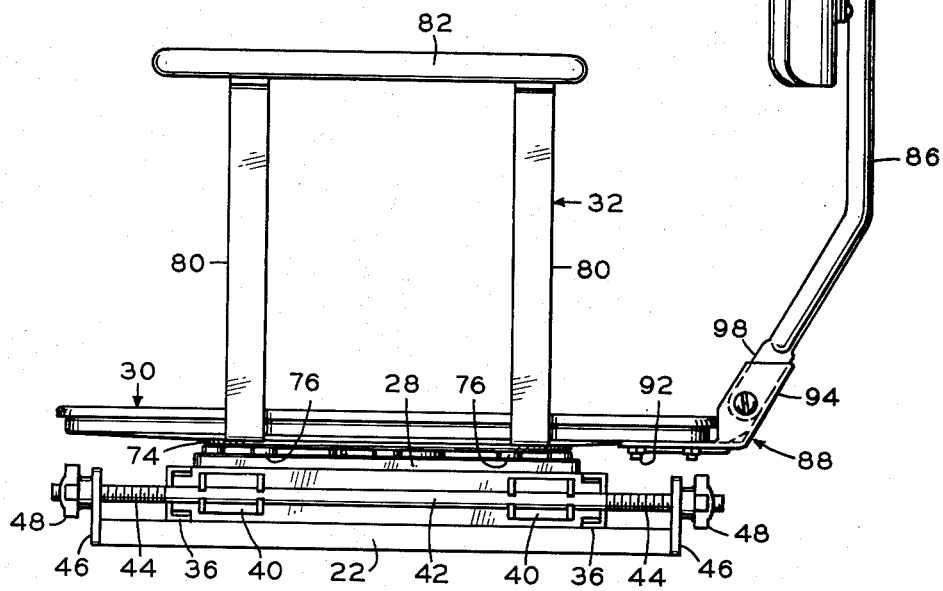
FIGURE 3 is a view in side elevation of the seat taken from the right side of FIGURE 1.
Figure 7:
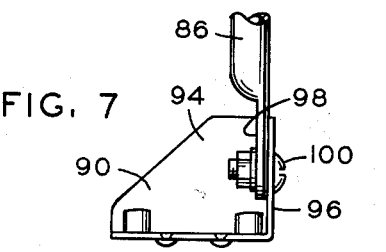
FIGURE 7 is an enlarged fragmentary view in front elevation showing the back rest supporting structure.
Figure 6:
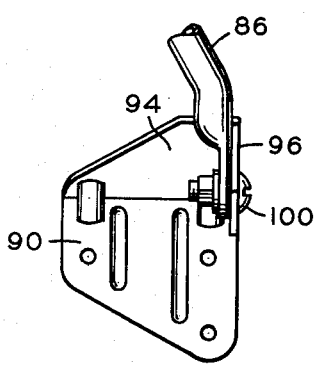
FIGURE 6 is an enlarged plan view showing a fragmentary portion of the back rest supporting structure.

As best shown in FIGURES 1, 3, 4, 5 and 8, the frame 24 is comprised of two C-shaped or channel shaped longitudinally running rails 36, which are connected at their ends by cross braces 38. The thwart clamps 26 are connected to the end braces 38 by brackets 40, and comprise a longitudinally extending rod 42 threaded at its end portions 44. Thwart engaging elements 46 are adjustable by means of threaded nuts 48 so that the thwart engaging elements may be drawn tight against the sides of the thwart, as best shown in FIGURE 3.

The carriage 28 is best shown in FIGURES 4, 5, 8 and 9. As there shown, it is comprised of a body 50 which supports wheels 52 by a boss portion 54 receiving the axles 56 of the wheels. Four such wheels are provided, two on each side, as best shown in FIGURE 4.

Figure 9:
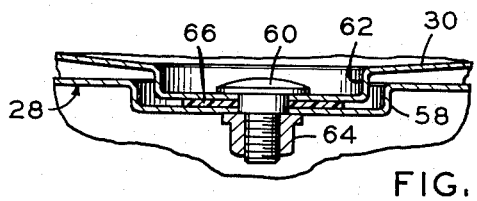
FIGURE 9 is an enlarged view in section taken similarly to FIGURE 5 but showing the pivoting connection of the boat seat to its supporting structure.

The carriage 28, as shown in FIGURES 5 and 9, is further provided with a central recessed section 58 having an opening receiving a pivot pin 60 connecting the seat to the carriage. The pivot pin 60 fits through a corresponding mating dish-shaped portion 62 of the seat and connects the seat to the frame by means of a nut 64. An intermediate Teflon washer 66 is provided between the seat and the carriage to compensate for wear and provide for self lubricating qualities.

Figure 8:
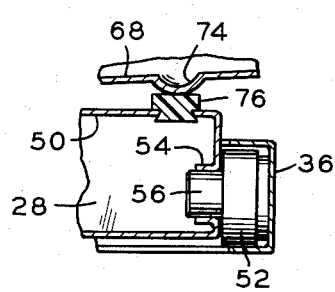
FIGURE 8 is an enlarged view in section taken on line 8—8 of FIGURE 5.

The seat 30 is best shown in FIGURES 4, 5 and 8. As there shown it is comprised of bottom walls 68 which flare slightly upwardly away from the dish-shaped center portion 62, and the ends of these walls terminate in a vertical rim 70. By means of this structure a conventional cushion 72, as shown in FIGURE 2, may be simply received upon the seat.

The seat 30 is further provided with a bearing rim 74 as best shown in FIGURES 5 and 8. This bearing portion bears against Teflon inserts 76 provided upon the top portion of the body 50 of the carriage to reduce friction and compensate for wear through the self-lubricating qualities of the Teflon.

Figure 2:
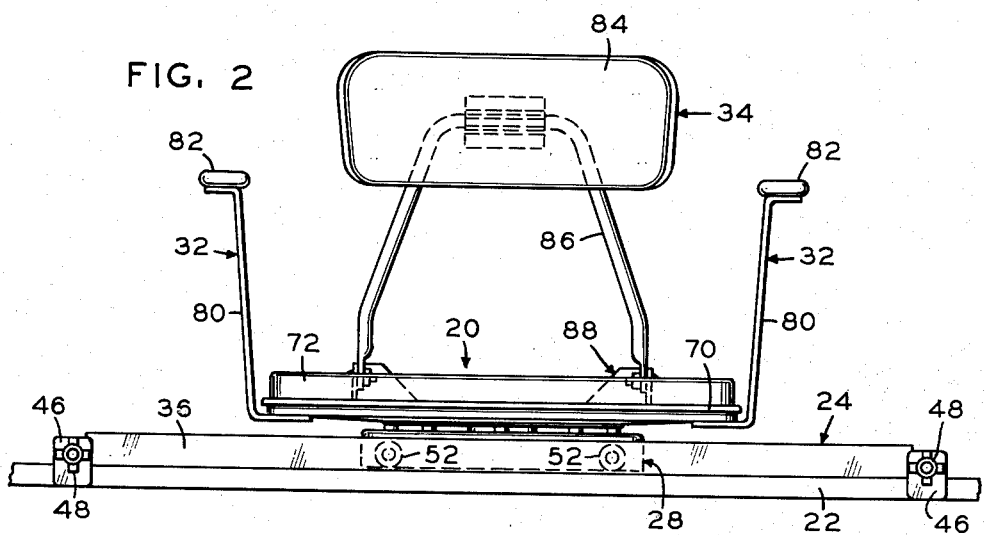
FIGURE 2 is a view in front elevation of the seat.

The arm rests 32 are best shown in FIGURES 1, 2 and 3. As there shown, they are constituted of Z-shaped braces 80 which may be simply secured to the bottom of the seat such as by welding or bolting. The top of the brace 80 is provided with an arm contacting portion 82 which may be padded upon which the arm of the user may rest.

The back rest 34 is best shown in FIGURES 1, 2, 3, 6 and 7. As there shown it is composed of a back cushion 84 secured to a U-shaped support 86, which is hingedly connected to hinged supporting means generally indicated by the reference numeral 88. The hinging means 88 constitutes a hinge plate shown in FIGURES 3, 6 and 7, indicated by the reference numeral 90. This hinge plate is secured to the bottom side of the seat by bolts 92, as shown in FIGURE 3, and has a back portion 94 limiting the backward movement of the back seat support 86. The hinged plate further has a side wall 96 supporting a flattened bottom portion 98 of the back support by means of a pivot pin 100.

*Use*

The portable boat seat of this invention is very simply employed. It is easily attached to the thwart of a boat by tightening the thwart clamp 26 against the sides of the thwart. This is done in an obvious fashion.

After the portable seat is connected to the thwart, the back rest 34, which in storage may be collapsed flat against the seat, can be moved to its limiting counter-clockwise position shown in FIGURE 3 merely by drawing it back to the limiting position defined by means of the stop wall 94 against which the support 86 of the back rest bears. In the aforementioned operation, the portable boat seat is now ready for use.

In use, the user, while sitting upon the boat seat, may very simply slide the seat from one end of the thwart to the other by merely shifting his weight in obvious fashion and pushing himself by leg action. The seat is moved from one end to another upon the frame rails 36 within which the wheels of the carriage move. Thus, the seat 30 carried upon the carriage can be moved in any fashion to the limiting positions defined by the length of the rails 36.

Also, during this operation, should the user desire to pivot the seat, this can be simply done as the seat pivots in a full 360° upon the carriage due to the pivoting connection provided by the pivot pin 60.

In the pivoting operation the weight of the seat is borne upon the Teflon washer 66 spaced between the seat and the carriage frame in addition to some weight borne upon the Teflon bearing 76 provided at the top of the carriage which supports the seat at the rim portion 74. In this manner the load is evenly distributed from the seat upon the carriage, while permitting full 360° revolution at any stage in the use of the seat.

It will be understood that in the use of this seat the arm rests 32 and the back rest 34 are used in an obvious fashion. This provides for a full degree of comfort by the user. It will also be understood, however, that the arm rests and the back rests may be dispensed with and that only the cushion 72 may be employed with the seat. Such use still provides for full sliding movement of the seat coupled with any pivotable movement of the seat desired. In this fashion it will be understood that the basic structure of the portable seat has a high degree of adaptability. It will also be understood that the cushion 72, which nests within the seat, is removable and may be made of kapok or other floating material such that the seat may be provided with loops and the like in conventional fashion and used as a life saving cushion.

Various changes and modifications may be made within this invention as above described and as will fully appear and be apparent to those skilled in the art. Such changes and modifications are within the scope and teaching of this invention as defined by the claims appended hereto.

What is claimed is:

1. A portable seating device for attachment to a thwart connected at opposite ends to opposite sides of a boat, said device having an elongated frame adapted to rest upon the thwart, said frame including tracks extending along and generally parallel to the edges of the thwart and extending a substantial distance between the ends of said thwart, a carriage mounted on the frame for movement along said tracks and a seat panel having pivot means mounting it upon the carriage whereby said seat panel may be horizontally pivoted about said pivot means and moved with said carriage along said tracks, and means for securing said frame to said thwart.

2. The portable seating device of claim 1 in which said seat is provided with a back rest hingedly mounted to the back side of said seat and movable from a folded position overlying the seat to a vertical position against a stop means.

3. The portable seating device of claim 1 in which said seat is provided with a back rest hingedly mounted to the back side of said seat and movable from a folded position overlying the seat to a vertical position against a stop means, and a pair of arm rests connected to opposite sides of said seat.

4. A portable seating device for attachment to a thwart connected at opposite ends to opposite sides of a boat, said device having an elongated frame adapted to rest upon the thwart, said frame including tracks extending along and generally parallel to the edges of the thwart and extending a substantial distance between the ends of said thwart, a carriage mounted on the frame for movement along said tracks and a seat panel having pivot means mounting it upon the carriage whereby said seat panel may be horizontally pivoted about said pivot means and moved with said carriage along said tracks, and means for securing said frame to said thwart, said pivot means comprising a central portion of the seat bearing upon a mating contoured central portion of the carriage and connected thereto by a pivot pin.

5. A portable seating device for attachment to a thwart connected at opposite ends to opposite sides of a boat, said device having an elongated frame adapted to rest upon the thwart, said frame including tracks extending along and generally parallel to the edges of the thwart and extending a substantial distance between the ends of said thwart, a carriage mounted on the frame for movement along said tracks and a seat panel having pivot means mounting it upon the carriage whereby said seat panel may be horizontally pivoted about said pivot means and moved with said carriage along said tracks, and means for securing said frame to said thwart, said pivot means comprising a central portion of the seat panel bearing upon a mating contoured central portion of the carriage and connected thereto by a pivot pin, and radial bearing means supporting the seat panel upon the carriage frame radially spaced from said pivot means comprising a depending circumferential bearing member contacting a raised anti-friction bearing member supported upon the carriage.

6. A portable seating device for attachment to a thwart connected at opposite ends to opposite sides of a boat, said device having an elongated frame adapted to rest upon the thwart, said frame including tracks extending along and generally parallel to the edges of the thwart and extending a substantial distance between the ends of said thwart, said tracks comprising a pair of elongated spaced track members having a channel shaped cross-section, a carriage mounted on the frame for movement along said tracks, said carriage being provided with wheels engaging said track members and a seat panel having pivot means mounting it upon the carriage whereby said seat panel may be horizontally pivoted about said pivot means, and moved with said carriage along said tracks and means for securing said frame to said thwart, said pivot means comprising a central portion of the seat panel bearing upon a mating contoured central portion of the carriage and connected thereto by a pivot pin, and radial bearing means supporting the seat panel upon the carriage frame radially spaced from said pivot means.

7. A portable seating device for attachment to a thwart connected at opposite ends to opposite sides of a boat, said device having an elongated frame adapted to rest upon the thwart, said frame including tracks extending along and generally parallel to the edges of the thwart and extending a substantial distance between the ends of said thwart, clamp means mounted upon the frame and adjustable to engage thwarts of varying widths, said tracks comprising a pair of elongated spaced track members having a channel shaped cross-section, a carriage mounted on the frame for movement along said tracks, said carriage being provided with wheels engaging said track members and a seat panel having pivot means mounting it upon the carriage, said pivot means comprising a central portion of the seat panel bearing upon a mating contoured central portion of the carriage and connected thereto by a pivot pin and radial bearing means supporting the seat panel upon the carriage frame radially spaced from said pivot means comprising a depending circumferential bearing member contacting a raised anti-friction bearing member supported upon the carriage, said seat panel being provided with a back rest hingedly mounted to the back side of said seat and movable from a folded position overlying the seat panel to a vertical position against a stop means.

References Cited in the file of this patent

UNITED STATES PATENTS

| | | |
|---|---|---|
| 980,328 | Nora-Gon | Jan. 3, 1911 |
| 2,483,552 | Lincoln | Oct. 4, 1949 |
| 2,710,644 | Krueger | June 14, 1955 |
| 2,799,322 | Jordan | July 16, 1957 |
| 2,836,223 | Kent | May 27, 1958 |
| 2,841,207 | Sweeney | July 1, 1958 |
| 2,843,348 | Samuels | July 15, 1958 |
| 2,914,793 | McMahan | Dec. 1, 1959 |

FOREIGN PATENTS

| | | |
|---|---|---|
| 573,236 | France | Mar. 6, 1924 |